United States Patent
Kim et al.

(10) Patent No.: US 12,434,325 B2
(45) Date of Patent: Oct. 7, 2025

(54) WELDING PRESSURE CONTROL SYSTEM, WELDING PRESSURE CONTROL METHOD USING THE SAME, AND WELDING SUBJECT THICKNESS MEASURING METHOD USING THE SAME

(71) Applicant: LG Energy Solution, Ltd., Seoul (KR)

(72) Inventors: Seong Jin Kim, Daejeon (KR); Jeong Yeon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/567,165

(22) PCT Filed: Oct. 20, 2022

(86) PCT No.: PCT/KR2022/016045
§ 371 (c)(1),
(2) Date: Dec. 5, 2023

(87) PCT Pub. No.: WO2023/068844
PCT Pub. Date: Apr. 27, 2023

(65) Prior Publication Data
US 2024/0269766 A1   Aug. 15, 2024

(30) Foreign Application Priority Data
Oct. 21, 2021   (KR) .................. 10-2021-0141422

(51) Int. Cl.
*B23K 20/00*   (2006.01)
*B23K 20/10*   (2006.01)
(Continued)

(52) U.S. Cl.
CPC .......... *B23K 20/106* (2013.01); *B23K 20/002* (2013.01); *B23K 20/26* (2013.01); *B23K 2101/36* (2018.08)

(58) Field of Classification Search
CPC ...... B23K 20/10; B23K 20/106; B23K 20/26; B23K 31/125; B23K 37/0247; B23K 11/253; B23K 20/12
See application file for complete search history.

(56) References Cited

U.S. PATENT DOCUMENTS 4,340,166 A * 7/1982 Bilane .................. G05B 19/182
                                                228/180.5
5,110,381 A * 5/1992 Heckard ............... B29C 66/116
                                                156/359

(Continued)

FOREIGN PATENT DOCUMENTS

JP       S5828342 A    2/1983
JP       H11509487 A   8/1999

(Continued)

OTHER PUBLICATIONS

Computer English translation of JP3963918B2 (Year: 2007).*

(Continued)

*Primary Examiner* — Erin B Saad
(74) *Attorney, Agent, or Firm* — Lerner David LLP (57) ABSTRACT

A welding pressure control system includes: an anvil on which a welding subject is supported; a horn that presses the welding subject; an elevating unit that supports the horn to be ascendable and descendable; a sensing unit that senses a pressure value varying depending on the ascent and the descent of the horn; and a control unit that controls the elevating unit based on the pressure value obtained from the sensing unit. The elevating unit includes a motor, a screw that receives driving power from a rotary axis of the motor and rotates, a vertically movable part that is coupled to the screw and moves vertically during the rotation of the screw, and a support that is coupled to the vertically movable part and supports the horn. The sensor is disposed circumferen- (Continued)

tially about the screw and pressed according to the vertical movement of the vertically movable part.

13 Claims, 5 Drawing Sheets

(51) Int. Cl.
*B23K 20/26* (2006.01)
*B23K 101/36* (2006.01)

(56) References Cited

U.S. PATENT DOCUMENTS

| | | | | |
|---|---|---|---|---|
| 5,295,700 | A * | 3/1994 | Crews | B23Q 1/545 |
| | | | | 279/5 |
| 5,829,115 | A * | 11/1998 | Speller, Jr. | B23Q 5/40 |
| | | | | 72/454 |
| 5,985,064 | A * | 11/1999 | Sato | H01L 24/75 |
| | | | | 156/64 |
| 6,118,095 | A * | 9/2000 | Nagano | B23K 11/253 |
| | | | | 219/110 |
| 6,190,296 | B1 * | 2/2001 | Gnad | B29C 66/92211 |
| | | | | 53/DIG. 2 |
| 6,491,785 | B1 * | 12/2002 | Sato | H01L 24/75 |
| | | | | 228/1.1 |
| 9,486,955 | B2 * | 11/2016 | Klinstein | B29C 66/932 |
| 10,746,703 | B2 * | 8/2020 | Klinstein | B29C 66/1122 |
| 11,014,192 | B2 * | 5/2021 | Gabre | B29C 65/08 |
| 11,407,181 | B2 * | 8/2022 | Vasko | B29C 66/006 |
| 11,517,977 | B2 * | 12/2022 | Ou | B23K 20/10 |
| 2005/0241143 | A1 * | 11/2005 | Mizuno | H05K 13/082 |
| | | | | 29/739 |
| 2006/0252625 | A1 * | 11/2006 | Owen | B65B 61/188 |
| | | | | 493/394 |
| 2007/0068991 | A1 * | 3/2007 | Handel | B23K 20/106 |
| | | | | 228/1.1 |
| 2008/0000944 | A1 * | 1/2008 | Gale | B29C 66/82 |
| | | | | 228/110.1 |
| 2009/0188966 | A1 * | 7/2009 | Klinstein | B29C 66/961 |
| | | | | 228/1.1 |
| 2014/0367018 | A1 * | 12/2014 | Klinstein | B29C 66/9231 |
| | | | | 156/64 |
| 2014/0367019 | A1 * | 12/2014 | Klinstein | B29C 66/80 |
| | | | | 156/64 |
| 2015/0352778 | A1 * | 12/2015 | Klinstein | B29C 66/9516 |
| | | | | 156/351 |
| 2015/0369779 | A1 * | 12/2015 | Kawamoto | B23K 31/125 |
| | | | | 73/588 |
| 2017/0129162 | A1 * | 5/2017 | Klinstein | B29C 66/73921 |
| 2018/0178313 | A1 * | 6/2018 | Nakayama | B23K 20/26 |
| 2019/0388997 | A1 * | 12/2019 | Martinez, Jr. | B23K 20/126 |
| 2021/0346977 | A1 * | 11/2021 | Ou | B23K 37/0258 |
| 2022/0324060 | A1 * | 10/2022 | Kurpiewski | B23K 20/004 |

FOREIGN PATENT DOCUMENTS

| | | |
|---|---|---|
| JP | 2001223244 A | 8/2001 |
| JP | 2006231698 A | 9/2006 |
| JP | 2006315002 A | 11/2006 |
| JP | 3963918 B2 | 8/2007 |
| JP | 4787603 B2 | 10/2011 |
| JP | 2012091213 A | 5/2012 |
| JP | 2013063521 A | 4/2013 |
| JP | 5779761 B2 | 9/2015 |
| JP | 2021049694 A | 4/2021 |
| JP | 2021053677 A | 4/2021 |
| KR | 19980065738 U | 12/1998 |
| KR | 100468263 B1 | 1/2005 |
| KR | 100585372 B1 | 5/2006 |
| KR | 100950977 B1 | 4/2010 |
| KR | 20160134992 A | 11/2016 |
| KR | 101690033 B1 | 12/2016 |
| KR | 20190031175 A | 3/2019 |
| KR | 20200107280 A | 9/2020 |
| KR | 102221010 B1 | 2/2021 |
| KR | 102259973 B1 | 6/2021 |
| KR | 102291337 B1 | 8/2021 |

OTHER PUBLICATIONS

Computer English translation of JP2021053677A (Year: 2021).*
Computer English translation of CN106735842A (Year: 2017).*
International Search Report for Application No. PCT/KR2022/016045 mailed Jan. 26, 2023, pp. 1-3.
Partial European Search Report including Written Opinion for Application No. 22884066.6 dated Sep. 26, 2024, pp. 1-12.
1 Extended European Search Report including Written Opinion for Application No. 22884066.6 dated Feb. 4, 2025. 11 pages.

* cited by examiner

WELDING PRESSURE CONTROL SYSTEM, WELDING PRESSURE CONTROL METHOD USING THE SAME, AND WELDING SUBJECT THICKNESS MEASURING METHOD USING THE SAME

CROSS-REFERENCE TO RELATED APPLICATIONS

The present application is a national phase entry under 35 U.S.C. § 371 of International Application No. PCT/KR2022/016045 filed on Oct. 20, 2022, which claims the benefit of the priority of Korean Patent Application No. 10-2021-0141422, filed on Oct. 21, 2021, which is hereby incorporated by reference in its entirety.

TECHNICAL FIELD

The present disclosure relates to a welding pressure control system, a welding pressure control method using the same, and a welding subject thickness measuring method using the same, and more particularly, to a welding pressure control system, which controls welding pressure via feedback control of ascent and descent of a horn on the basis of a pressure value sensed according to the ascent and the descent of the horn, and a welding pressure control method and welding subject thickness measuring method using the welding pressure control system.

BACKGROUND ART

As the technical development of and a demand for mobile devices increase, a demand for secondary batteries as energy sources rapidly increases. In particular, among the secondary batteries, lithium secondary batteries having have high energy density and discharge voltage are much researched and commercialized.

Generally, the secondary batteries each have a structure in which an electrode assembly having a structure in which an electrode and a separator are stacked is embedded with an electrolyte in a battery case. In the electrode constituting the electrode assembly, it is necessary to connect electrode tabs, each of which is a portion of a non-coating portion of the electrode, to each other and connect these electrode tabs to an electrode lead not only for connection to the outside but also for electrical connection of the electrodes to each other in the electrode assembly.

Here, various methods are used to attach the electrode tab to the electrode, and examples thereof include ultrasonic welding. The ultrasonic welding is a method of performing welding in such a manner that vibrational energy is selectively applied to a horn according to a control signal of a computer to allow the horn to be in contact with and press welding subjects ("electrode tab", "electrode lead", etc.) mounted on an anvil facing the horn, and then, frictional heat is generated through ultrasonic vibrations. In a broad sense, an apparatus in which the horn, the anvil, etc., are assembled may be also referred to as an ultrasonic welding assembly.

In such an ultrasonic welding assembly, pressure applied to the welding subjects by the horn is one of the most important factors determining welding quality for the welding subjects. That is, the pressure applied to the welding subjects by the horn needs to be maintained at a fixed level during the welding so that the welding subjects with good welding quality may be obtained.

According to the related art, efforts are made to provide a pressure sensor at a lower side of the anvil to obtain the pressure under which the horn presses the welding subjects. However, a pressure value obtained from the pressure sensor provided at the lower side of the anvil is used only as a reference material for setting initial welding conditions, and there is a problem that it is difficult to substantially control the pressure applied to the welding subjects by the horn on the basis of the pressure value during the welding.

Accordingly, technologies for a welding pressure control system capable of controlling the pressure applied to the welding subjects by the horn during the welding, are required.

DISCLOSURE OF THE INVENTION

Technical Problem

The present disclosure has been devised to solve the problems stated above and an object of the present disclosure is to provide a welding pressure control system, which feedback-controls welding pressure via control of ascent and descent of a horn on the basis of a pressure value sensed according to the ascent and the descent of the horn, and a welding pressure control method and welding subject thickness measuring method using the welding pressure control system.

Technical Solution

The present disclosure provides a welding pressure control system characterized by including: an anvil on which a welding subject is supported; a horn that is provided to face the anvil and presses the welding subject; an elevating unit that supports the horn to be ascendable and descendable; a sensing unit that senses a pressure value varying depending on the ascent and the descent of the horn; and a control unit that controls driving of the elevating unit on the basis of the pressure value obtained from the sensing unit, wherein the elevating unit includes a motor, a screw that receives driving power from a rotary axis of the motor and rotates, a vertically movable part that is coupled to the screw and moves vertically during the rotation of the screw, and a support that is coupled to the vertically movable part and supports the horn, wherein the sensor is provided in a circumferential direction of the screw and pressed according to the vertical movement of the vertically movable part.

The sensing unit may be inserted into the screw so that the screw is rotatable.

The sensing unit may have an annular shape in which a hollow is defined.

The sensing unit may be disposed adjacent to the screw and provided spaced a predetermined distance from the circumference of the screw.

The motor may include a servo motor.

The control unit may control an amount of a rotation angle, a rotation position, a rotation speed, and revolutions of the motor on the basis of the pressure value obtained from the sensing unit.

The screw may be a ball screw.

The sensing unit may be a load cell sensor.

The control unit may include a processor, which processes driving information for driving control of the motor on the basis of the pressure value sensed by the sensing unit, and a driver which receives the driving information from the processor and transmit a driving signal to the motor.

The processor may include a programmable logic control unit (PLC).

The driver may include a servo motor driver.

In addition, the welding pressure control system according to the present disclosure may further include a monitoring unit that outputs an image of the pressure value sensed by the sensing unit and provides the image for a user.

The present disclosure provides a welding pressure control method characterized by including: a pressing process of pressing a welding subject by allowing a horn to ascend and descend through an elevating unit that supports the horn to be ascendable and descendable with respect to the welding subject seated on an anvil; a sensing process of sensing a pressure value varying depending on the ascent and the descent of the horn through a sensing unit provided in a circumferential direction of a screw that is connected to a rotary axis of a motor, which transmits driving power to the elevating unit, and rotates; and a control process of controlling driving of the elevating unit on the basis of the pressure value obtained in the sensing process.

In the sensing process, the sensing unit may be pressed by a vertically movable part, which is coupled to the screw and moves vertically during the rotation of the screw, to sense the pressure value.

In the control process, driving of the motor including a servo motor may be controlled to control the driving of the elevating unit.

In the control process, an amount of a rotation angle, a rotation position, a rotation speed, and revolutions of the motor may be controlled on the basis of the pressure value obtained from the sensing unit.

The present disclosure provides a welding subject thickness measuring method characterized by including: a setting process of setting, to an initial value, a position value of a motor, which transmits driving power to an elevating unit that allows a horn to ascend and descend, at a time at which the horn is in contact with an anvil; a welding subject providing process of providing a welding subject on the anvil; a position variation value measuring process of measuring a position variation value of the motor at a time at which the horn is in contact with the welding subject; and a welding process of calculating subject thickness calculating a thickness of the welding subject on the basis of the position variation value.

The motor may include a servo motor.

Advantageous Effects

The welding pressure control system and the welding pressure control method according to the present disclosure may include the sensing unit that senses the pressure value varying depending on the ascent and the descent of the horn, and the control unit that controls the driving of the elevating unit, which supports the horn to be ascendable and descendable, on the basis of the pressure value. Accordingly, there is the advantage that the welding efficiency may be optimized by controlling the pressure, under which the horn presses the welding subject, in real-time according to the pressure value while monitoring the pressure value in real-time during the welding.

The welding subject thickness measuring method according to the present disclosure may measure the thickness of the welding subject by using the position variation value of the motor that transmits the driving power to the elevating unit that allows the horn to ascend and descend. Accordingly, there is the advantage that the problem such as the defect (e.g., folding of the electrode tab) of the welding subject, may be automatically detected to improve the workability.

BRIEF DESCRIPTION OF THE DRAWINGS

FIG. 1b is a conceptual view illustrating a state after the horn descends toward an anvil in the welding pressure control system in FIG. 1a.

FIG. 2b is a conceptual view illustrating a state after the horn descends toward an anvil in the welding pressure control system in FIG. 2a.

MODE FOR CARRYING OUT THE INVENTION

Hereinafter, preferred embodiments of the present invention will be described in detail with reference to the accompanying drawings so as to enable those skilled in the art to which the present disclosure pertains to easily carry out the embodiments of the present invention. The present invention may, however, be embodied in different forms and should not be construed as limited by the embodiments set forth herein.

The parts unrelated to the description, or the detailed descriptions of related well-known art that may unnecessarily obscure subject matters of the present disclosure, will be ruled out in order to clearly describe the embodiments of the present invention. In the drawings, like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe his or her invention in the best ways.

Welding Pressure Control System

The present disclosure provides a welding pressure control system including an anvil 100 on which a welding subject is supported, a horn 200 that is provided to face the anvil 100 and presses the welding subject, an elevating unit 300 that supports the horn 200 to be ascendable and descendable, a sensing unit 400 that senses a pressure value varying depending on the ascent and the descent of the horn 200, and a control unit 500 that controls driving of the elevating unit 300 on the basis of the pressure value obtained from the sensing unit 400.

Here, any object is available as the welding subject (not shown) as long as the any object is an object to be welded by the anvil 100 and the horn 200. For example, the welding subject may be an electrode tab of a secondary battery, and an electrode lead connected to the electrode tab may be further included.

The anvil 100 is a component, on which the welding subject is supported, and may have various configurations.

For example, the anvil 100 may have various shapes. Preferably, the anvil 100 may have a top surface formed to be flat so as to support the welding subject.

Figure 1A:
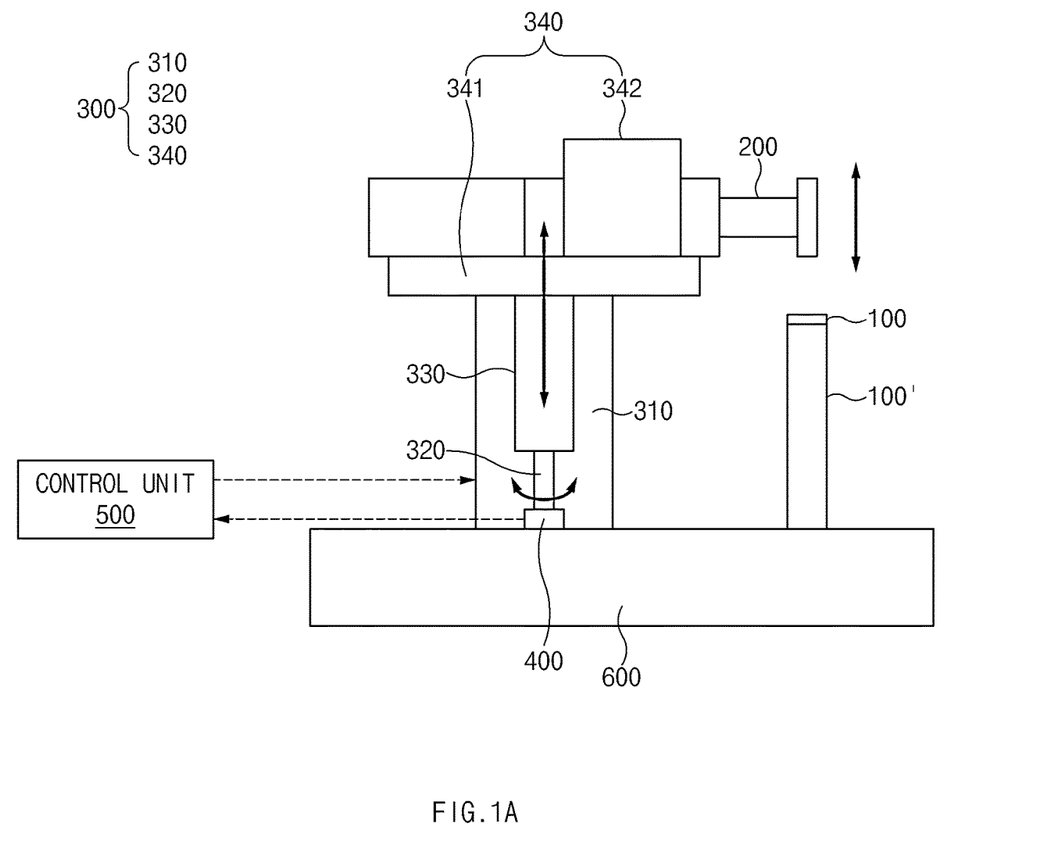
FIG. 1a is a conceptual view illustrating an operation in which a horn ascends and descends in Embodiment 1 of a welding pressure control system according to the present invention.
Figure 1B:
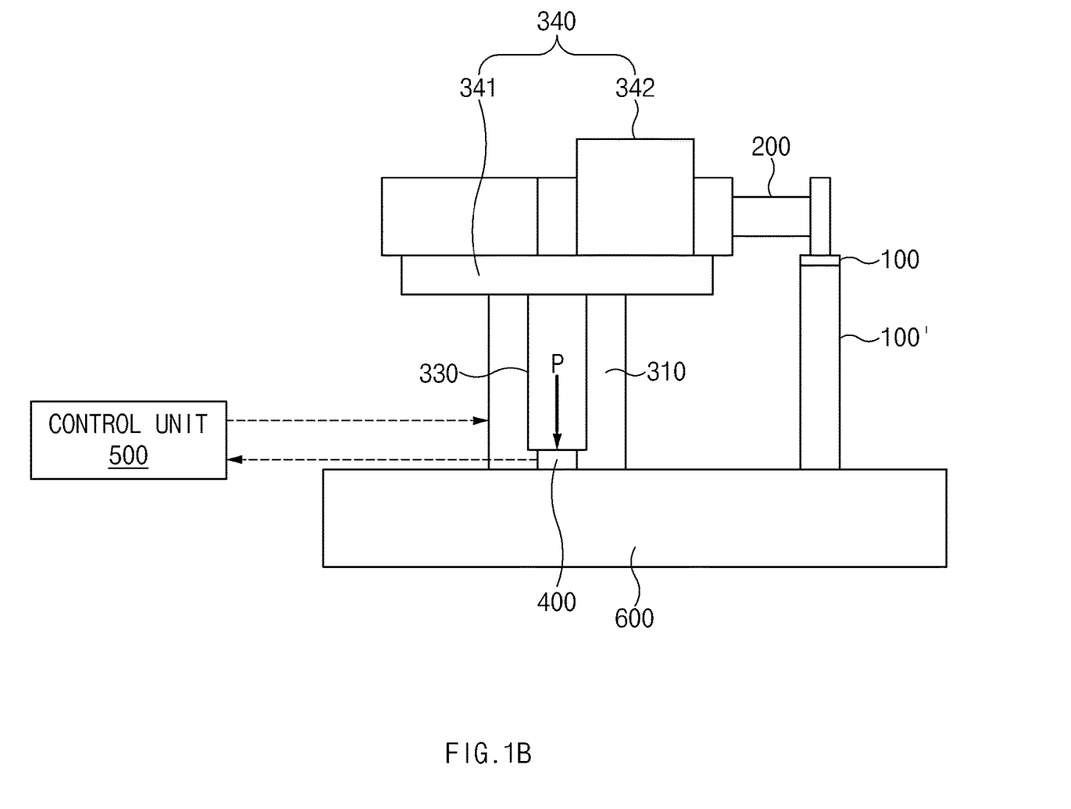

As illustrates in FIGS. 1a and 1b, the anvil 100 may be seated on and fixed to an anvil frame 100'. Here, any component is available as the anvil frame 100' as long as the any component is a component capable of supporting the anvil 100 from below the anvil 100. The anvil frame 100' may include an actuator, etc., to allow the anvil 100 to ascend and descend in a vertical direction.

The horn 200 is a component, which is provided to face the anvil 100 and presses the welding subject, and may have various configurations.

Specifically, the horn 200 may be provided to be elevatable with respect to the anvil 100 at a position facing the anvil 100 to press the welding subject seated on the anvil 100. Here, the horn 200 may apply ultrasonic vibrations to the welding subject in the pressed state to perform welding on the welding subject.

For this, the horn 200 may include a vibrator (not shown) that converts electrical energy into mechanical energy so as to apply the ultrasonic vibrations to the welding subject, a booster (not shown) that reduces or amplifies an amplitude of the vibrator, and a head (not shown) that delivers vibrating energy to the welding subject and fuses the welding subject.

The elevating unit 300 is a component, which supports the horn 200 to be ascendable and descendable, and may have various configurations.

Here, any component is available as the elevating unit 300 as long as the any component is a component that supports the horn 200 to be ascendable and descendable. For example, the elevating unit 300 may include a linear actuator, etc., which allows the horn 200 to move linearly in the vertical direction.

The elevating unit 300 may be supported by a fixing unit 600 provided below the elevating unit 300.

More specifically, the elevating unit 300 may include a motor 310, a screw 320 that receives driving power from a rotary axis of the motor 310 and rotates, a vertically movable part 330 that is coupled to the screw 320 and moves vertically during the rotation of the screw 320, and a support 340 that is coupled to the vertically movable part 330 and supports the horn 200.

The motor 310 is a component, which generates driving energy for rotating the screw 320, and may have various configurations.

Specifically, the motor 310 may include a rotary shaft (not shown) that receives torque from a rotor (not shown) and a stator (not shown) and rotates, and the rotary shaft may be connected directly or indirectly to the screw 320 to deliver the driving power to the screw 320.

Here, the motor 310 may include various types of motors. Preferably, the motor 310 may include a servo motor capable of precisely controlling a rotation direction, a rotation speed, a rotational acceleration speed, a rotation angle, and so on, so as to more accurately control the ascent and the descent of the horn 200.

The screw 320 is a component, which receives the driving energy from the rotary shaft of the motor 310 and rotates, and may have various configurations.

Here, the screw 320 may have an outer circumference on which a thread is formed in a longitudinal direction of the screw 320 so that the vertically movable part 330 to be described later is screw-coupled to allow the vertically movable part 330 to move according to the rotation of the screw 320.

The screw 320 may include various types of screws. Here, the screw 320 may include a ball screw to obtain high power transmission efficiency through rolling motions of balls.

The vertically movable part 330 is a component, which is coupled to the screw 320 and moves vertically during the rotation of the screw 320, and may have various configurations.

Here, the vertically movable part 330 may have an inner circumference on which a thread corresponding to the thread of the screw 320 is formed so as to reciprocate in the longitudinal direction of the screw 320 according to the rotation of the screw 320. Accordingly, the vertically movable part 330 may move linearly in the vertical direction according to the rotation of the screw 320.

Here, the vertically movable part 330 may slidably move along a guide part (not shown) that guides a moving direction of the vertically movable part 330. The guide part may extend in the longitudinal direction of the screw 320.

The support 340 is a component, which is coupled to the vertically movable part 330 and supports the horn 200, and may have various configurations.

For example, the support 340 may include a seating part 341, which is provided between the horn 200 and the vertically movable part 330 and supports the horn 200, and a housing 342 which is provided above the seating part 341 and coupled to the horn 200.

Here, the seating part 341 is a component, which is provided between the horn 200 and the vertically movable part 330 and supports the horn 200, and may have various configurations.

In more detail, the seating part 341 may be coupled to the vertically movable part 330 to move together with the vertically movable part 330 according to the movement of the vertically movable part 330. Here, as the seating part 341 is a component that supports the horn 200, the horn 200 seated on the seating part 341 may also move vertically.

Such a seating part 341 may have various shapes, and, for example, may have a plate shape having a top surface on which the horn 200 is seated.

The housing 342 is a component, which is provided above seating part 341 and coupled to the horn 200, and may have various configurations.

In more detail, the housing 342 may be coupled to the horn 200 seated on the seating part 341. Here, the housing 342 may have a structure in which an empty space is defined so that at least a portion of the horn 200 is inserted into and fixed to the empty space. The portion of the horn 200, which is inserted into the housing 342, may be a portion including the booster that reduces or amplifies the amplitude of the vibrator described above.

Such a housing 342 may be provided to be detachable from the horn 200 so that the horn 200 is easily replaced. For this, the housing 342 may include a lower housing (not shown) disposed below the horn 200, and an upper housing (not shown) disposed above the horn 200.

Here, the lower housing and the upper housing may be detachably coupled to each other in various methods and, for example, may be bolt-coupled to each other through a plurality of coupling bolts.

The sensing unit 400 is a component, which senses the pressure value varying depending on the ascent and the descent of the horn 200, and may have various configurations.

Specifically, the sensing unit 400 may interfere with the elevating unit 300, which allows the horn 200 to ascend and descend, to sense the pressure value varying depending on the ascent and the descent of the horn 200. Here, the sensing unit 400 may sense in real-time the pressure value varying during the welding, and may be supported by the fixing unit 600 as illustrated FIGS. 1*a* to 2*b*.

Such a sensing unit 400 may be provided at any position at which the pressure value varying depending on the ascent and the descent of the horn 200 may be sensed.

Preferably, the sensing unit 400 may be provided in a circumferential direction of the screw 320 described above, so that the welding pressure control system according to the present disclosure has a simple structure and also the pressure value varying depending on the ascent and the descent of the horn 200 is more accurately sensed. In this case, the sensing unit 400 may be provided between the vertically movable part 330 and the fixing unit 600 so that the sensing unit 400 is pressed by an end of the vertically movable part 330 moving along the screw 320.

In one example, as illustrated in FIGS. 1*a* and 1*b*, the sensing unit 400 may be provided to be inserted into the screw 320 so that the screw 320 is rotatable. In this case, the sensing unit 400 may be provided to have an annular ring shape in which a hollow is defined. Preferably, the sensing unit 400 may have an inner diameter greater than an outer diameter of the screw 320 so that the screw 320 is rotatable.

Figure 2A:
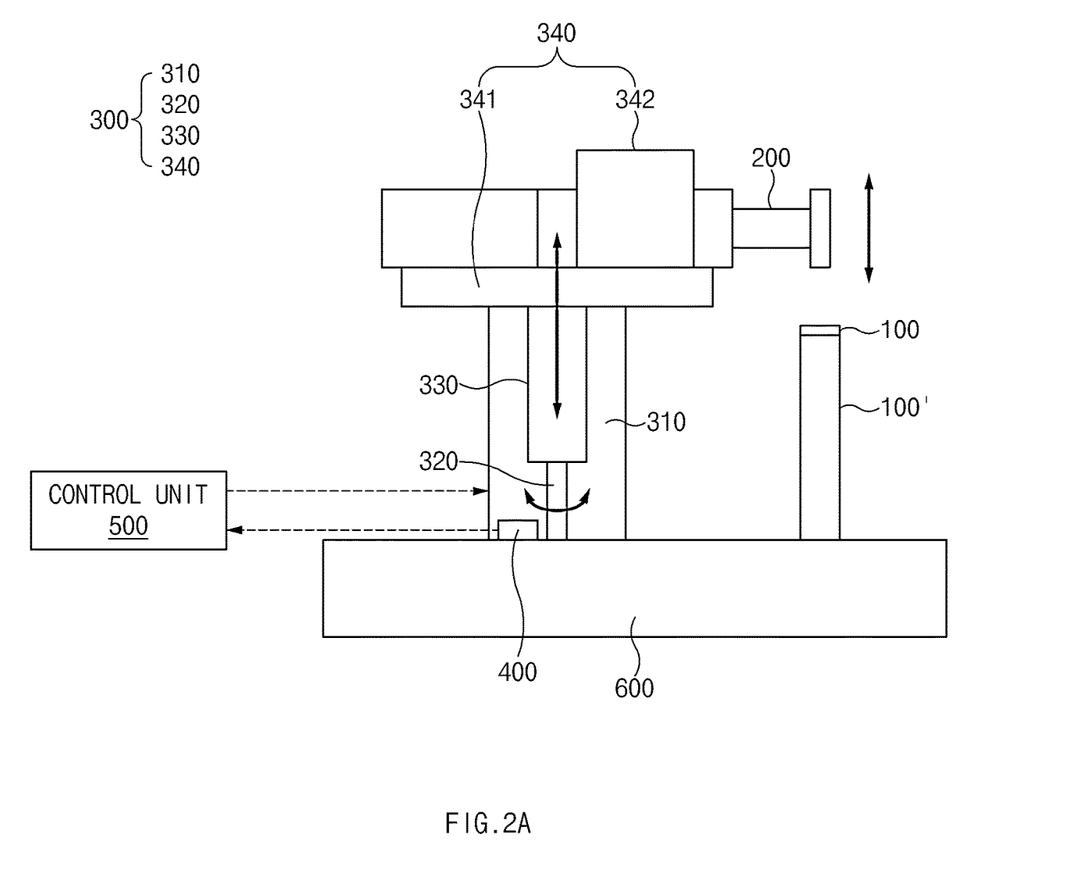
FIG. 2a is a conceptual view illustrating an operation in which a horn ascends and descends in Embodiment 2 of a welding pressure control system according to the present invention.
Figure 2B:
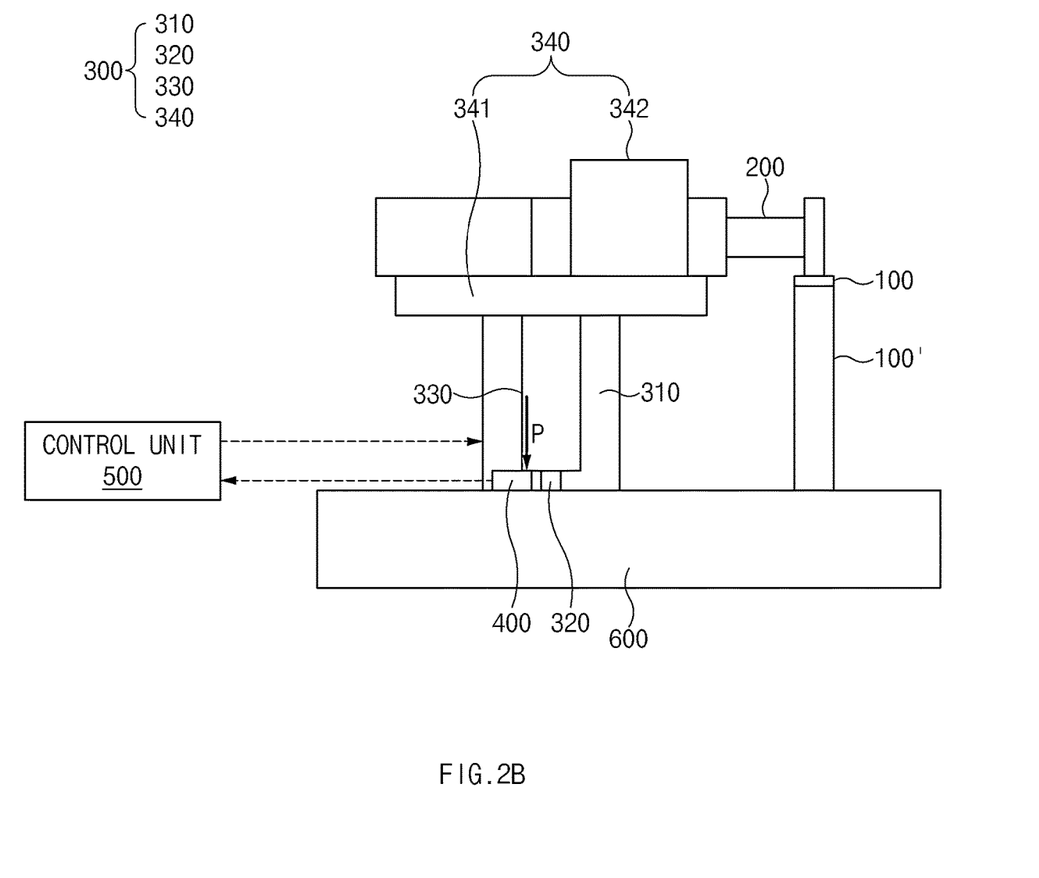

In another example, as illustrated FIGS. 2*a* and 2*b*, the sensing unit 400 may be disposed adjacent to the screw 320 and provided spaced a predetermined distance from the circumference of the screw 320. In this case, the sensing unit 400 may have at least a partial region which is pressed by vertically movable part 330 to sense a variation in pressure value.

Such a sensing unit 400 may be configured as a pressure sensor and, more particularly, may be a load cell sensor that outputs an electrical signal of the pressure applied to the sensing unit 400. Here, various types of load cell sensors may be used as the load cell sensor. For example, various types of load cell sensors such as a strain gauge type load cell, a beam load cell, a platform load cell, an s-beam load cell, a canister load cell, or a tension and compression load cell, may be used as the load cell sensor.

The sensing unit 400 may be provided in plurality. Here, in order to obtain more various pressure values, some of the sensing units 400 may be provided at the circumference of the screw 320 and the others may be provided at a lower side of the anvil 100, etc. These pressure values may be useful in critical to quality (CTQ) management.

The welding pressure control system according to the present disclosure includes the control unit 500 that may control welding pressure, under which the horn 200 presses the welding subject, on the basis of the pressure value obtained from the sensing unit 400. Here, as the welding pressure under which the horn 200 presses the welding subject varies depending on a vertical position of the horn 200, the elevating unit 300 that vertically moves the horn 200 may be controlled to achieve the control of the welding pressure.

Specifically, the control unit 500 is a component, which controls the driving of the elevating unit 300 on the basis of the pressure value obtained from the sensing unit 400, and may have various configurations.

Specifically, on the basis of the pressure value sensed in real-time from the sensing unit 400, the control unit 500 may feedback-control the welding pressure of the horn 200 so that the welding pressure of the horn 200 on the welding subject is maintained at a fixed level during the welding.

For this, the control unit 500 may control the motor 310, which transmits the driving power to the elevating unit 300, on the basis of the pressure value obtained from the sensing unit 400. Specifically, the control unit 500 may control an amount of a rotational angle, a rotation position, a rotation speed, revolutions, and so on, of the motor 310.

Figure 3:
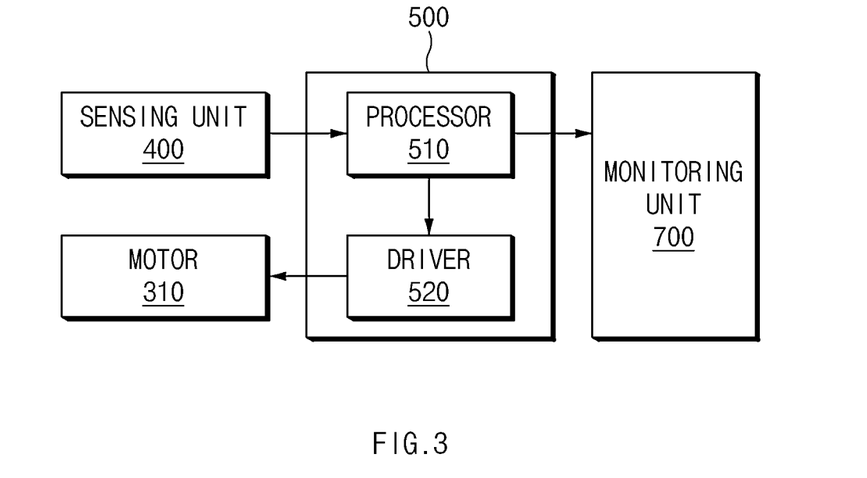
FIG. 3 is a block diagram specifically illustrating a control unit used in each of Embodiment 1 and Embodiment 2 of a welding pressure control system according to the present invention.

For this, as illustrated in FIG. 3, the control unit 500 may include a processor 510, which processes driving information for the driving control of the motor 310 on the basis of the pressure value sensed by the sensing unit 400, and a driver 520 which receives the driving information from the processor 510 and transmits a driving signal to the motor 310.

Here, the processor 510 is a component, which processes the driving information for the driving control of the motor 310 on the basis of the pressure value sensed by the sensing unit 400, and may have various configurations.

Specifically, the processor 510 may calculate the driving information for the driving control of the motor 310 or output the driving information to the driver 520.

Here, the driving information may be a signal value which allows the elevating unit 300 to ascend and descend by a difference between the pressure value sensed by the sensing unit 400 and a preset reference value. Here, the preset reference value may be variously set by a user.

For example, when the pressure value sensed by the sensing unit 400 is less than the preset reference value, the processor 510 may calculate and output the signal value which allows the elevating unit 300 to descend so as to increase the pressure value applied to the sensing unit 400, and when the pressure value sensed by the sensing unit 400 is greater than the preset reference value, the processor 510 may calculate and output the signal value which allows the elevating unit 300 to ascend so as to decrease the pressure value applied to the sensing unit 400, thereby capable of feedback-controlling the welding pressure.

For this, the processor 510 may include a programmable logic control unit (PLC) to control the processing of the driving information. In this case, the processor 510 may include a central processing unit (CPU), an input part (not shown) and an output part (not shown) that connect an external device and a signal to each other, a memory (not shown) that stores data, and so on.

The driver 520 is a component, which receives the driving information from the processor 510 and transmits the driving signal to the motor 310, and may have various configurations.

Specifically, the driver 520 may calculate an amount of a rotational angle, a rotation position, a rotation speed, revolutions, and so on, of the motor 310 on the basis of the driving information received from the processor 510, and transmit the driving signal (e.g., voltage and current) for motor driving to the motor 310.

Any component is available as the driver 520 as long as the any component is a component that may control the motor 310 described above. For example, when the motor 310 described above is configured as a servo motor, the driver 520 may also include a servo motor driver.

The welding pressure control system according to the present disclosure may further include a monitoring unit 700 that provides the user with the pressure value sensed by the sensing unit 400.

Here, the monitoring unit 700 is a component, which outputs an image of the pressure value sensed by the sensing unit 400 and provides the image for the user, and may have various configurations.

For example, the monitoring unit 700 may receive the driving information from the processor 510 described above and output an image to the user. The driving information may be the pressure value sensed by the sensing unit 400.

Here, any component is available as the monitoring unit 700 as long as the any component is a component that may output an image of the pressure value to the user. Accordingly, the monitoring unit 700 may include a display unit on which the pressure value may be output as image data, and may be implemented as, for example, a computer, a notebook computer, a tablet computer, or the like.

Welding Pressure Control Method

The present disclosure may provide a welding pressure control method that may control welding pressure using the welding pressure control system described above.

Specifically, the disclosure provides a welding pressure control method characterized by including a pressing process of pressing a welding subject by allowing a horn 200 to ascend and descend through an elevating unit 300 that supports the horn 200 to be ascendable and descendable with respect to the welding subject seated on an anvil 100, a sensing process of sensing a pressure value varying depending on the ascent and the descent of the horn 200 through a sensing unit 400 provided in a circumferential direction of a screw 320 that is connected to a rotary axis of a motor 310, which transmits driving power to the elevating unit 300, and rotates, and a control process of controlling driving of the elevating unit 300 on the basis of the pressure value obtained in the sensing process.

Here, the pressing process is a process in which the welding subject is pressed by allowing the horn 200 to ascend and descend through the elevating unit 300 that supports the horn 200 to be ascendable and descendable with respect to the welding subject seated the anvil 1000. The pressing process may be performed in various methods.

The elevating unit 300 is a component, which supports the horn 200 to be ascendable and descendable, and the specific description thereof may be replaced with the content of the elevating unit 300 described above.

Here, the sensing process is a process in which the pressure value varying depending on the ascent and the descent of the horn 200 is sensed through the sensing unit 400 provided in the circumferential direction of the screw 320 that is connected to the rotary shaft of the motor 310, which transmits driving power to the elevating unit 300, and rotates. The sensing process may be performed in various methods.

In the sensing process, the sensing unit 400 may be coupled to the screw 320 and pressed by a vertically movable part 330, which moves vertically during the rotation of the screw 320, to sense the pressure value.

Here, the sensing unit 400 is a component, which senses the pressure value varying depending on the ascent and the descent of the horn 200, and the specific description thereof may be replaced with the content of the sensing unit 400 described above.

Here, the control process is a process, in which the driving of the elevating unit 300 is controlled on the basis of the pressure value obtained in the sensing process, and may be performed in various methods.

In the control process, driving of the motor 310 including a servo motor may be controlled to control the driving of the elevating unit 300. In more detail, in the control process, the driving of the elevating unit 300 may be controlled by controlling an amount of a rotational angle, a rotation position, a rotation speed, and revolutions of the motor 310 on the basis of the pressure value obtained from the sensing unit 400.

Here, the control process may be performed by the control unit 500 described above, and the specific description of the control unit 500 may be replaced with the content described above.

Welding Subject Thickness Measuring Method

The present disclosure may further provide a welding subject thickness measuring method that may measure a thickness of a welding subject using the welding pressure control system described above.

In more detail, the present disclosure may provide a welding subject thickness measuring method characterized by including a setting process of setting, to an initial value, a position value of a motor, which transmits driving power to an elevating unit 300 that allows a horn 200 to ascend and descend, at a time at which the horn 200 is in contact with an anvil 100, a welding subject providing process of providing the welding subject on the anvil 100, a position variation value measuring process of measuring a position variation value of the motor at a time at which the horn 200 is in contact with the welding subject, and a thickness calculating process of calculating a thickness of the welding subject on the basis of the position variation value.

The setting process is a process in which the initial value is set as the position value of the motor, which transmits the driving power to the elevating unit 300 that allows the horn 200 to ascend and descend, at a time at which the horn 200 is in contact with the anvil 100. The setting process may be performed in various methods. Here, the motor is a component corresponding to the motor 310 described above, and the specific description thereof may be replaced with the content of the motor 310 described above. Here, the motor may be a servo motor.

Specifically, in the setting process, the horn 200 may be in contact with a top surface of the anvil 100 in a state in which the welding subject is not seated on the anvil 100, and the initial value may be set as the position value of the motor at a time at which the horn 200 is in contact with the anvil 100. Here, the position value of the motor may be understood as a rotational angle of the motor.

The welding subject providing process is a process, in which the welding subject is provided on the anvil 100, and may be performed in various methods. Here, the welding subject may be variously provided and, for example, may be a plurality of electrode tabs of a secondary battery that are staked vertically.

The position variation value measuring process is a process, in which the position variation value of the motor at a time at which the horn 200 is in contact with the welding subject is measured, and may be performed in various methods.

Specifically, the position variation value measuring process may be performed by measuring the position variation value of the motor at a time at which the horn 200 descends toward the welding subject and is in contact with the welding subject after the welding subject is seated on the anvil 100.

That is, as the vertically movable part 330 supporting the horn 200 at a height in the process of measuring the position variation value, descends less by the thickness of the welding subject when compared to the setting process, the position value of the motor that controls a vertical position of the vertically movable part 330 changes to generate the position variation value. Here, the position variation value of the motor may be understood as a variation value of the rotational angle of the motor.

Here, the motor may further include an encoder in order to detect the position variation value. Various types of encoders may be used as the encoder.

The thickness calculating process is a process, in which the thickness of the welding subject is calculated on the basis of the position variation value, and may be performed in various methods.

For example, in the thickness calculating process, the thickness value of the welding subject may be calculated by analyzing a correlation between the position variation value and the height of the vertically movable part (or the height of the horn). Here, when the plurality of stacked electrode tabs are provided as the welding subject, a worker can detect a factor in defects such as folding of electrode tab on the basis of the calculated thickness value, by comparing the thickness of the stacked electrode tabs and a preset thickness value of the electrode tabs.

Although the present invention has been described with reference to the limited embodiments and drawings, the present invention is not limited thereto and may be variously implemented by those of ordinary skill in the art to which the present disclosure pertains, within the technical idea of the present disclosure and an equivalent of the appended claims.

DESCRIPTION OF THE SYMBOLS

100: Anvil
100': Anvil frame
200: Horn
300: Elevating unit
310: Motor
320: Screw
330: Vertically movable part
340: Support
341: Seating part
342: Housing
400: Sensing unit
500: Control unit
510: Processor
520: Driver
600: Fixing unit
700: Monitoring unit

The invention claimed is:

1. A welding pressure control system comprising:
an anvil on which a welding subject is supported;
a horn provided to face the anvil and configured to press the welding subject;
an elevating unit configured to support the horn, the elevating unit being operable to cause the horn to ascend and descend;
a sensing unit configured to sense a pressure value that varies depending on the ascent or the descent of the horn; and
a control unit configured to control operation of the elevating unit based on the pressure value obtained from the sensing unit,
wherein the elevating unit comprises:
  a motor,
  a screw configured to receive driving power from a rotary axis of the motor and rotate,
  a vertically movable part rotatably coupled to the screw and configured to move vertically by the rotation of the screw, and
  a support coupled to the vertically movable part and configured to support the horn,
wherein the sensing unit surrounds the screw such that the screw is rotatable and is pressed according to the vertical movement of the vertically movable part.

2. The welding pressure control system of claim 1, wherein the sensing unit encircles the screw such that the screw is rotatable.

3. The welding pressure control system of claim 2, wherein the sensing unit has an annular shape in which a hollow center is defined.

4. The welding pressure control system of claim 1, wherein the sensing unit is disposed adjacent to the screw and is spaced a predetermined distance from the circumference of the screw.

5. The welding pressure control system of claim 1, wherein the motor comprises a servo motor.

6. The welding pressure control system of claim 5, wherein the control unit controls a rotation angle, a rotation position, a rotation speed, and revolutions of the motor based on the pressure value obtained from the sensing unit.

7. The welding pressure control system of claim 1, wherein the screw is a ball screw.

8. The welding pressure control system of claim 1, wherein the sensing unit is a load cell sensor.

9. The welding pressure control system of claim 1, wherein the control unit comprises:
a processor configured to process driving information for control of the motor based on the pressure value obtained by the sensing unit; and
a driver configured to receive the driving information from the processor and transmit a driving signal to the motor.

10. The welding pressure control system of claim 9, wherein the processor further comprises a programmable logic control unit (PLC).

11. The welding pressure control system of claim 9, wherein the driver comprises a servo motor driver.

12. The welding pressure control system of claim 1, further comprising a monitoring unit configured to output an image of the pressure value sensed by the sensing unit and display the image for a user.

13. A welding pressure control system comprising:
an anvil on which a welding subject is supported;
a horn provided to face the anvil and configured to press the welding subject;
an elevating unit configured to support the horn, the elevating unit being operable to cause the horn to ascend and descend;
a sensing unit configured to sense a pressure value that varies depending on the ascent or the descent of the horn; and
a control unit configured to control operation of the elevating unit based on the pressure value obtained from the sensing unit,
wherein the elevating unit comprises:
  a motor,
  a screw configured to receive driving power from a rotary axis of the motor and rotate,
  a vertically movable part rotatably coupled to the screw and configured to move vertically by the rotation of the screw, and
  a support coupled to the vertically movable part and configured to support the horn,
wherein the sensing unit is disposed circumferentially about a circumference of the screw and is pressed according to the vertical movement of the vertically movable part, and wherein the sensing unit encircles the screw such that the screw is rotatable.

* * * * *